Oct. 14, 1952 A. A. HOCHER 2,613,965
CLAMP
Filed June 25, 1949
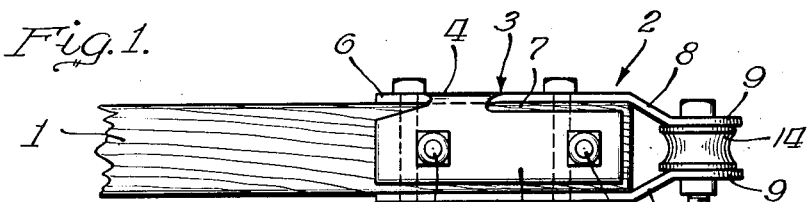
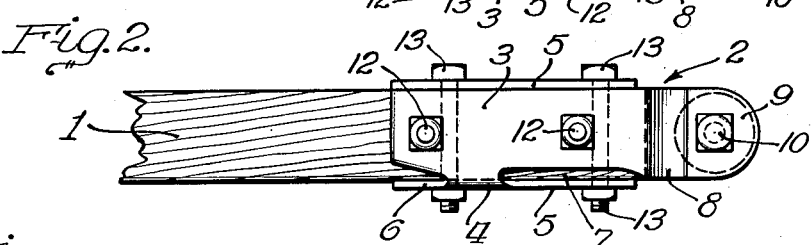
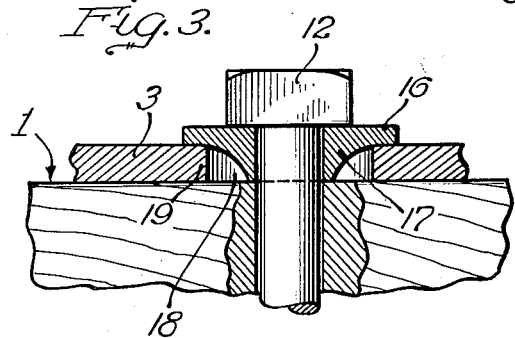
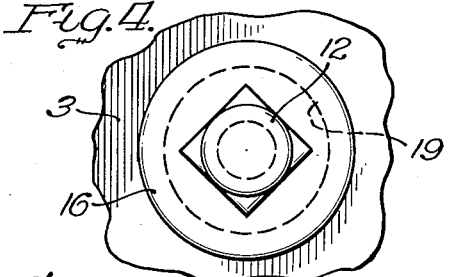
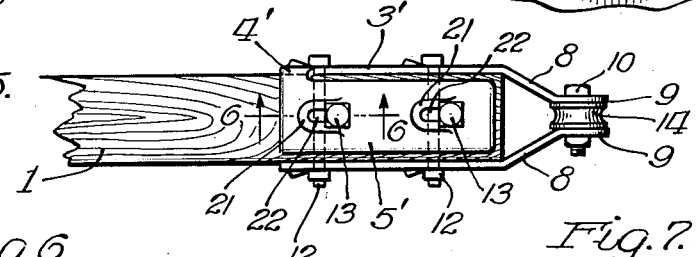
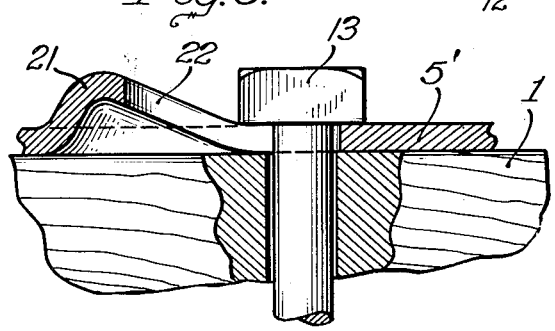
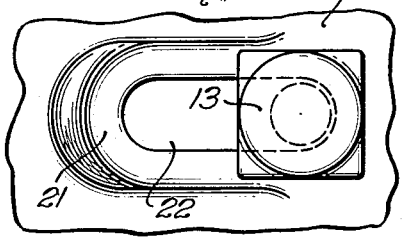
INVENTOR.
Andrew A. Hocher
BY
Brown Jackson Boettcher Dienner
Attys Patented Oct. 14, 1952

2,613,965

UNITED STATES PATENT OFFICE 2,613,965

CLAMP

Andrew A. Hocher, Glenshaw, Pa., assignor to Hubbard & Company, Pittsburgh, Pa., a corporation of Pennsylvania Application June 25, 1949, Serial No. 101,439

11 Claims. (Cl. 287—1)

This invention relates to clamps for connecting or attaching a tension (or compression) load endwise upon a wood bar or timber.

Clamps or hitches for this general purpose find utility in power line construction, for example, in guy wire construction, in supporting suspension insulators, and the like.

It is known to bolt metal straps to opposite sides of a bar of wood, and to rely upon the frictional grip so produced to hold the parts together. Cross bolts with washers and plates have been provided to prevent splitting of the end of the bar by the strap clamping bolts, but the friction of such lateral clamps do not aid in supporting the load attached to the straps.

I am aware that it has been proposed to employ pieces of angle bars fitted to adjacent sides and clamped together by bolts extending through the legs at right angles to the flat faces of the wood bar. Such clamps are not satisfactory. I have observed that the stiffness of the angle must be overcome in order to apply the flat sides of the legs to the flat wood faces. As a result, such clamps are not a satisfactory solution of the problem.

I have conceived the possibility of providing a simple, low cost clamp in which a pair of clamp straps have side plates integrally connected to them, so that the friction of the side plates may be added to that of the straps without requiring the resistance to bending of the connection at the corner of an angle bar to be overcome. The means for carrying this concept into effect is to cut a plate into the form of a strap with a side plate, and to notch the connection between the strap and plate to leave only a short integral portion between them, preferably toward the rear of the fitting. This portion acts as a hinge. I have found that such a connection, when it is bent at right angles, will allow the plate to be drawn up against the side of the bar without much resistance to bending, but at the same time it is strong enough in shear to carry a heavy load upon the clamp.

The severing of the front end of the strap and front end of the side plate allows the strap to press heavily inwardly upon the front end of the bar ahead of the bolts when the clamp is put under load, and thereby it serves to increase the load carrying ability of the clamp.

To this end, the length of the wood ahead of the bolts may be made somewhat longer than is usually done, so that with the straps being brought together rather sharply at the end of the wood, there is a strong tendency to compress the wood ahead of the bolts. The side plates extend to the end of the wood and confine the wood so placed under compression upon all four sides.

There may then be superposed upon the structure aforesaid the self-energizing action of the wedge means on the straps and plates, as in my copending application, Serial Number 81,005, filed March 11, 1949, or the wedge means carried on the bolts, as in my copending application, Serial Number 101,438, filed June 25, 1949. With or without a self-energizing grip, the clamp of my invention is a marked improvement upon the prior art devices now employed for this purpose.

Now in order to acquaint those skilled in the art with the manner of constructing and operating a device embodying my invention, I shall describe, in connection with the accompanying drawings, a specific embodiment of the same.

In the drawings:

Figure 1 is a plan view of one form of clamp of my invention;

Figure 2 is a side elevational view of the device shown in Figure 1;

Figure 3 is an enlarged sectional view of a modification in which a self-energizing clamp is secured by the use of a cone washer;

Figure 4 is a plan view of the structure shown in Figure 3;

Figure 5 is a top plan view of a modified form of my invention;

Figure 6 is an enlarged sectional view taken on the line 6—6 of Figure 5; and

Figure 7 is a plan view of the structure shown in Figure 6.

In the drawings, like reference numerals indicate like parts.

Referring now to the structure shown in Figure 1, the wood bar 1 is of rectangular section. In this case it is substantially square. Obviously, the exact shape of the cross section is not important, but it should be a rectangular parallelogram for best advantage. Wood comes from the lumbering processes as raw material in that form at minimum cost. The clamp 2 is attached to the right hand end of the bar 1, and is intended to impose a tension load upon the bar 1. The opposite end of the bar may be attached to a similar fitting or otherwise anchored as desired.

The clamp 2 comprises a pair of identical clamp members, each consisting of a strap portion 3, to which, by an integral flexible hinge portion 4, there is attached a side plate 5. The strap member 3 and the side plate 5 are preferably cut out of a piece of metal plate, the hinge portion 4 being formed by notches 6 at the rear and slot 7 at the front cut preferably prior to bending of the two parts 3 and 4 at right angles to each other. The forward part of the strap 3 in each case comprises a diagonal portion 8 and an ear 9 which is provided with a central hole through which is extended a bolt 10 to join a like ear 9 on the companion clamp member. Machine bolts are extended through openings in the strap members to clamp the strap members upon opposite sides of the bar 1. Similarly, bolts 13, 13 at right angles to the aforesaid bolts 12, 12 clamp the side plates 5, 5 flat against the opposite sides of the bar 1. This second set of bolts 13, 13 which clamp the side plates together, is preferably set ahead of the bolts 12, 12 which clamp the straps 3, 3 together. A pulley or sheave 14 may be mounted on the bolt 10 to receive a loop or bight of a guy wire or other strand to impose tension upon the device. It will be observed that the forward end of the wood bar 1 extends forward of the bolts a substantial distance, and that the straps 3, 3 have the inwardly bent portions 8, 8 in such position that pull upon the sheave 14 tends to draw the side plates together upon this extended part of the wood bar and to compress the wood in a vertical direction as viewed in Figure 1 ahead of the cross bolt 13. The slots 7, 7 in each of the clamp members permits of this compression occurring without interference. At the same time the hinge portion 4 connects the straps and their corresponding side plate members together for transmitting endwise pull imposed upon the strap member 3 upon its corresponding side plate 5. At the same time this hinge member 4 is of sufficient flexibility due to its limited cross section that the side plates 5 may be drawn tight against the side faces of the wood bar 1 without substantial interference from resistance to bending at the hinge portion 4. The slot 7 allows the strap portion to be pulled down towards the longitudinal axis of the bar without interference from the side plate, and yet the side plate confines the wood laterally so as to prevent escape of the wood by plastic deformation. While I have shown the hinge portion as disposed well towards the rear, the location of this hinge portion, so long as it does not interfere with the clamping action aforesaid, and particularly the compression of the forward end of the bar, may be varied.

Where the clamp is particularly subject to atmospheric influence, as alternatingly wetting and drying out, and consequently tending to expand and to shrink, I may modify the aforesaid clamp of Figures 1 and 2 by the addition of a self-energizing wedge means of my prior application, Serial Number 81,005, of March 11, 1949, or the more specific application thereof disclosed in my copending application Serial Number 101,438, filed June 25, 1949, in which latter case I mount a conical washer centered in a hole in the strap or plate as the case may be. Thus, in the construction of Figures 1 and 2, I may place under the head and nut of each bolt 12, 12 and 13, 13 the conical wedge washer 16 having the convex tapered part 17 projecting into a hole 18 of substantially larger diameter than is required for passing the shank of the bolt 12. In this construction as shown in Figure 3, assume that the plate 3 is pulled to the right relative to the bolt 12, the margin 19 about the rear of the hole 18 will be forced to pass under the round tapered part of the projection 17 and be forced inwardly with respect to the head of the bolt. In other words, it puts the bolt under greater tension, and, hence, presses itself more firmly against the surface of the wood bar 1.

As shown in Figures 5 to 7, the construction of the clamp members, and their location on the bar 1 is substantially identical with that shown in Figures 1 and 2, but in this case the hinge portion 4' is disposed further towards the end of the clamp member remote from the front end where the bolt 10 is attached. It is observed that in the embodiments shown the bolts 12, 12 connecting the longer plates are spaced apart longitudinally of the fitting and the bolts 13, 13 which connect the shorter plates, are likewise spaced apart and disposed at right angles to the bolts 12, 12. Thus each pair of bolts 12, 13 lies approximately in the same transverse plane to establish a region of gripping which embraces all four sides of the wood bar 1. Thus there are produced two regions of complete circumferential constriction which gives the fittings an excellent hold upon the wood and prevents escape of the wood by plastic deformation laterally.

The means for providing the self-energizing action in this case includes the inclined slotted boss 21 which is pressed up about the slot 22 through which slot the shank of the bolt 13 is passed and extended through a hole in the wood bar, and through a like slot 22 and boss 21 on the opposite side under the bolt head or nut. Initially the bolt is clamped in the position shown in Figure 6, the nut being drawn up to bring the pressure up to the value which will produce friction between the plate 5' and the face of the wood bar 1 sufficient to sustain the load. Thereafter, when the device is put under endwise load of tension pulling the plate 5 towards the right through the hinge connection 4', the wedge shaped projections 21 will ride under the bolt heads of the bolt 13 and put the bolt under greater tension and force the plate 5' inwardly against the face of the wood bar 1. Instead of embossing a wedge shaped projection about the slot, the edges of the slot may be turned up to secure the same effect. This same inclined surface is carried on each plate about the slot under each bolt head and nut.

From the foregoing it will be seen that I have provided a simple and inexpensive clamp of superior action, either with the self-energizing action built into the same, or without.

I do not intend to be limited to the precise details shown and described, except as they are specifically required to be included by the appended claims; since those skilled in the art may wish to modify and adapt the construction which I have herein shown for their own purposes and individual situations without departing from the claimed invention.

I claim:

1. In a device of the class described for attaching a load to a wood bar, the combination of a pair of angle fittings, each angle fitting comprising two plates disposed at substantially right angles to each other and being integrally joined together at their edges by a short relatively flexible joining portion of substantially less length than their adjacent edges said short joining portion between the two plates being spaced from the front end of the shorter plate, said joining portions being adapted to act as hinges, one of the plates of each angle fitting being of greater length than the other, and being offset toward the longitudinal axis of the wood bar to be clamped and ending at its front end in a lug, bolts extending through the shorter plates to clamp them upon opposed sides of the wood bar, the longer plates being adapted to be disposed on opposite sides of the bar to be clamped, and having their lugs extending beyond the adjacent front end of the bar to be clamped and brought into register, a pin extending through said lugs to form a hitch for a tension load, bolts extending through said longer plates to clamp said plates upon opposite sides of the bar, said longer plates being free at their front ends to be pulled toward each other upon the end of the wood bar by application of the load, without interference from the shorter plates.

2. The device of claim 1 wherein the holes in the plates through which the bolts pass are substantially larger than the cross section of the bolts to allow of motion of the plates relative to the bolts and along the surface of the bar, and wedge means between the ends of the bolts and the plates inclined outwardly of the plates in a direction opposite to that in which the plates tend to be moved by the applied load, said wedge means acting by motion of the plates relative to the bolts to tension the bolts and press the plates of a pair toward each other to increase the grip of the plates upon the surfaces of the bar.

3. The device of claim 2 wherein the bolts have heads at their outer ends and the wedge means are carried by the plates and are moved with the plates to wedge under the heads of the bolts.

4. The device of claim 2 wherein the wedge means are carried by the bolts, and the plates ride under said wedge means and are thereby forced against the surface of the bar.

5. In a device of the class described, a pair of angle fittings each being adapted to embrace adjacent sides of a wood bar to be clamped, each fitting comprising a pair of plates disposed at substantially right angles to each other and being hinged together, hitch means for attaching a load to both angle fittings, bolts extending through opposed pairs of plates said plates having bolt holes allowing longitudinal motion of the plates relative to the bolts, and wedge means acting between the bolt heads and the plates on all four sides to press the plates inwardly upon relative motion of the plates with respect to the bolts.

6. In combination with a wood bar of substantially rectangular cross section to be clamped for endwise connection with a load, a pair of angle fittings each adapted to embrace adjacent sides of the wood bar, each fitting comprising a pair of plates disposed at substantially right angles to each other and said plates of each pair being hinged together along a minor part of the length of their adjacent edges, each fitting having a forwardly extending ear on one of its plates, said ears being adapted to be connected together to form a hitch disposed beyond the front end of the bar, bolts extending through opposed pairs of plates of both fittings, the hinge between said plates being disposed toward the rear of the fittings.

7. The combination of claim 6 wherein said plates have bolt holes permitting longitudinal motion of the plates relative to the bolts and wherein there is disposed metallic wedge means between the heads of the bolts and the plates on all four sides whereby movement of the plates relative to the bolts forces the plates against the corresponding surfaces of the wood bar.

8. The device of claim 1 wherein the bolts which extend through the shorter plates are spaced apart longitudinally of said fittings and lie in approximately the same planes, transversely to the length of the bar to be clamped, as the bolts that extend through said longer plates.

9. The device of claim 5 wherein the bolts are disposed in pairs, the bolts of each pair lying in approximately the same transverse plane and at right angles to each other.

10. The device of claim 6 wherein the bolts are disposed in pairs, the bolts of each pair lying in approximately the same transverse plane and at right angles to each other.

11. A four way clamp connecting a load endwise to a bar of wood of substantially rectangular cross section, which comprises a pair of unitary angle clamp members each member comprising a longer plate adapted to engage one side of the wood bar and to extend beyond the end of the wood bar to form a hitch portion, said hitch portions being adapted to receive a load to be sustained and a shorter plate at substantially right angles to the longer plate for engaging the side of the bar adjacent the said one side, said plates having a relatively flexible connection of short length connecting the edges of said two plates intermediate their ends, said connecton being integral with said plates each plate having a bolt slot on each side of said flexible connection, said bolt slots lying on substantially the longitudinal axis of the plate, bolts adapted to fit in holes in the bar of wood to be clamped, said bolts extending through said bolt slots, heads for the ends of said bolts, and wedge means between the bolt heads and the plates inclined outwardly of the plates in a direction opposite to that in which the plates tend to be moved by the applied load.

ANDREW A. HOCHER.

REFERENCES CITED

The following references are of record in the file of this patent:

UNITED STATES PATENTS

| Number | Name | Date |
| --- | --- | --- |
| 653,532 | Schimmel | July 16, 1900 |
| 1,380,369 | Fields | June 7, 1921 |
| 1,836,743 | Austin | Dec. 15, 1931 |
| 1,972,615 | Austin | Sept. 4, 1934 |
| 2,441,709 | Manke | May 18, 1948 |